United States Patent [19]

Lahm

[11] Patent Number: 4,587,871
[45] Date of Patent: May 13, 1986

[54] NC TURRET LATHE

[75] Inventor: Heinrich Lahm, Neuhausen, Fed. Rep. of Germany

[73] Assignee: Index-Werke KG Hahn & Tessky, Esslingen, Fed. Rep. of Germany

[21] Appl. No.: 519,627

[22] Filed: Aug. 2, 1983

[30] Foreign Application Priority Data

Aug. 26, 1982 [DE] Fed. Rep. of Germany ....... 3231782

[51] Int. Cl.$^4$ ............................................. B23B 29/32
[52] U.S. Cl. ....................................... 82/2 R; 82/21 R; 82/36 A; 29/47; 29/48.5 R; 74/813 L; 74/814; 74/824; 74/826
[58] Field of Search ................... 82/36 A, 2 R, 21 R, 82/21 A, 21 B; 29/48.5 R, 48.5 A, 49, 46, 47; 74/814, 813 L, 824, 826, 813 R; 408/35

[56] References Cited

U.S. PATENT DOCUMENTS

| 2,616,159 | 11/1952 | Curtis | 29/47 |
| 3,717,912 | 2/1973 | Lahm | 82/36 A |
| 4,015,491 | 4/1977 | Peter | 29/47 |
| 4,057,881 | 11/1977 | Stephens | 408/35 |
| 4,058,033 | 11/1977 | Lahm et al. | 82/2 R |

FOREIGN PATENT DOCUMENTS 1552503 12/1969 Fed. Rep. of Germany ..... 82/36 A

OTHER PUBLICATIONS

Mechanical Engineering Design, Shigley 3rd Edition, McGraw-Hill, 1977, pp. 542-543.

Primary Examiner—Francis S. Husar
Assistant Examiner—Jerry Kearns
Attorney, Agent, or Firm—Neuman, Williams, Anderson & Olson

[57] ABSTRACT

NC turret lathe comprising a tool turret rotatable about an indexing axis and mounted for rotation in a turret slide displaceable in a direction parallel to the indexing axis, also comprising a turret indexing drive monitored by a control mechanism for rotating the tool turret, and a slide drive monitored by a control mechanism for displacing the turret slide. In order to decrease the expenditure required to index the tool turret, the slide drive also constitutes the turret indexing drive, and the slide drive control also serves to monitor the turrent indexing drive. An actuatable coupling is provided between the slide drive and the turret to prevent undesired rotation of the turret when it is only to be slidably displaced.

8 Claims, 11 Drawing Figures

NC TURRET LATHE

The invention relates to an NC turret lathe comprising a tool turret rotatable about an indexing axis and mounted for rotation in a slidably guided turret slide, further comprising a turret indexing drive monitored by a control mechanism, and also comprising a slide drive monitored by a control mechanism.

In known automatic turret latches (vide, for example, German Pat. No. 2,401,083), a first motor with a control mechanism associated therewith is provided for the feeding motion and measurement of the path of the slide, also referred to as sleeve, carrying the turret, which control mechanism may comprise a linear scale or a resolver which is connected to a ball roller spindle displacing the slide so that the path measurement is effected by way of a digital angle of rotation measurement. A further motor in the form of a hydraulic motor serves to rotate or index the tool turret, and considerable driving force and sophisticated hydraulic control valves are required to accelerate and brake the turret equipped with tools and constituting a relatively large mass in such a way as to ensure short indexing times and exact positioning of the turret.

The object underlying the invention was to decrease the expenditure required to index the tool turret in NC turret lathes. Departing from a lathe of the kind mentioned at the outset, this object is attained in accordance with the invention by the turret indexing drive being constituted by the slide drive (sleeve drive) and being monitored by the slide drive control mechanism, and by an actuatable drive coupling being provided between the slide drive and the turret to prevent undesired rotation of the turret when it is only to be pushed forward or pulled back. With the solution according to the invention, not only a drive motor is saved, but also considerably less controlling expenditure is required, for if there is a fixed association between the angles of rotation of the turret and the path of the turret slide (sleeve), the path measurement and positioning system for the feeding of the turret slide, which is needed in any case, can also be used to monitor the indexing and positioning of the tool turret. Furthermore, the slide drive also readily provides the power required to ensure short indexing times for the turret, i.e., rapid acceleration and delaying of the tool turret during its rotation.

In a preferred embodiment of the lathe according to the invention, a particularly compact, i.e., relatively short structural component in the direction of motion of the turret slide is obtained by arranging parallel to the guiding direction of the turret slide an indexing drive shaft along which a gear member of a turret indexing gear is displaceable, which gear member is in constant drive connection with the indexing drive shaft, and by the turret indexing gear being connected to the turret slide and displaceable therewith. The motor which pushes forward and rotates the turret must then not be positioned at the rear on the turret slide (sleeve), which is relatively long anyhow. Furthermore, this construction offers the possibility of using a housing accommodating the turret indexing gear as feed member for the turret slide (sleeve): To this end, the slide drive is provided in the known manner with a ball roller spindle extending parallel to the guiding direction of the turret slide and comprising a nut which, in accordance with the invention, is connected to the gear housing of the turret indexing gear; the turret slide is furthermore connected to the housing of the turret indexing gear and thus moved together with it.

In order to be able to displace the turret slide (sleeve) without the turret being rotated, the drive coupling could be arranged, for example, between the turret and a turret shaft coaxial therewith. In the embodiment with an indexing drive shaft parallel to the direction of motion of the turret slide, it is, however, advisable in the above case to put the indexing drive shaft out of operation, so that it is recommended to provide the drive coupling between the indexing drive shaft and the slide drive.

In a preferred embodiment of the lathe according to the invention, unintentional rotation of the tool turret is prevented when the drive coupling is disengaged by the turret being prevented from rotation via a releasable locking device which is designed so as to be released when the drive coupling is engaged.

The drive coupling may, for example, be in the form of an electromagnetically, pneumatically or hydraulically actuaed toothed coupling. However, separation of such a toothed coupling or similar couplings can be dispensed with by employing a friction coupling as drive coupling. Even minute tool corrections are then possible without regard needing to be paid to the separation of the toothed coupling.

In a preferred embodiment of the lathe according to the invention, a common actuating mechanism is provided for the drive coupling and the turret locking device in order to, for example, with one single hydraulic cylinder, first engage the drive coupling and then release the locking device. A particularly simple construction is obtained by the locking device comprising a first annular gear on the turret slide and a second annular gear on the turret, by the turret being displaceable in the direction of its indexing axis in order to release the locking device and by the locking device concentric with the turret being engageable and releasable by axial displacement of the turret. This principle is particularly easily realized by the turret being mounted on a shaft displaceable in its longitudinal direction and provided with a toothing constituting a component of the turret indexing drive, for the shaft can then simultaneously carry a member of the locking device or of the coupling constituting the locking device. If the toothing provided on the turret shaft is given the required length in the axial direction, displacement of the turret shaft does not impede engagement of this toothing in the next toothed wheel of the turret indexing gear.

As previously mentioned, the control of the slide drive may, in the lathe according to the invention, assume the task of monitoring the turret indexing. To enable the turret indexing position to be reported back it is, however, advisable to connect the turret to a stepping signal device which indicates its angle of rotation position. In the lathe according to the invention comprising a displaceable turret shaft, the stepping signal device can then also assume the task of monitoring the state of the turret locking device, and, to this end, the turret shaft in a particularly advantageous embodiment carries angle of rotation markings and at least one axial position marking which are scanned by scanners, more particularly, scanners which operate in a non-contacting manner.

In a particularly advantageous embodiment of the lathe according to the invention, the actuating mechanism for the drive coupling and the turret locking device is integrated in the turret slide (sleeve), to which end, the turret shaft carries a piston, and the turret slide forms a cylinder accommodating this piston, which are designed so as to produce a double acting pressure medium cylinder.

Since the turret slide (sleeve) or the slide drive is, in any case, provided with a path measurement system which may be in the form of a synchro, there is no difficulty in compensating again for the slide displacement, connected with rotation of the turret, after disengagement of the drive coupling.

Further features, advantages and details of the invention are apparent from the attached claims and/or the following description and accompanying drawings of some particularly advantageous embodiments of the turret lathe according to the invention.

Figure 1:
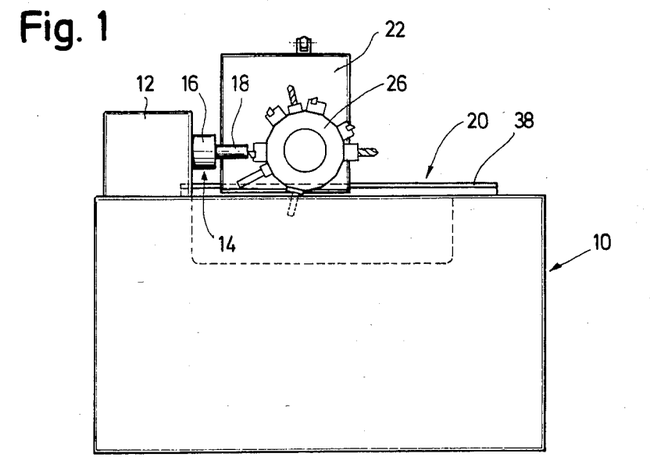
FIG. 1 is a highly simplified front view of a lathe according to the invention, viewed in the direction of the turret indexing axis.
Figure 2:
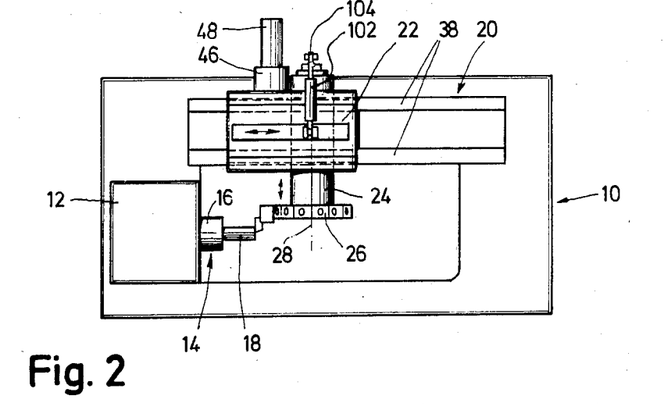
FIG. 2 is a top view of the lathe.
Figure 3:
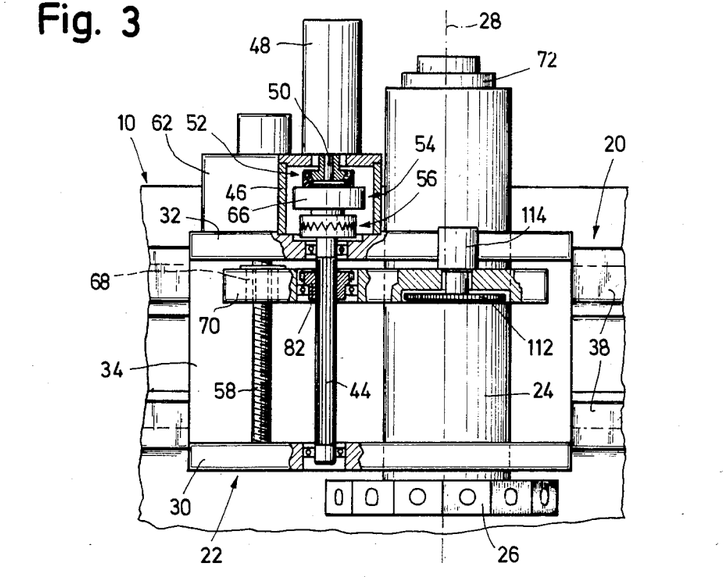
FIG. 3 is a top view of the turret with the slides carrying it.

FIGS. 1 and 2 show a machine frame 10 on which a headstock 12 is stationarily mounted. The headstock serves as bearing for a working spindle 14 comprising a chuck 16 which holds a workpiece 18. Mounted on the machine frame 10 is a guide 20 on which there is guided a lower turret slide 22 which is displaceable in the direction of the double-headed arrow shown in FIG. 2. The lower turret slide serves as bearing for an upper turret slide 24, which is normally referred to as sleeve, and in which a tool turret 26 is mounted for rotation about an axis 28. The drives for displacement of the upper slide 24 in the direction of the axis 28 and for displacement of the lower slide 22 along the guide 20 have been omitted in FIGS. 1 and 2 for reasons of simplicity. The drive for the lower slide 22 is also of conventional design in the automatic NC turret lathes according to the invention.

A first embodiment of the structural component comprised of the lower and upper slides 22 and 24 and the tool turret 26 shall now be described in detail with reference to FIGS. 3 to 5, 6A and 7.

Figure 4:
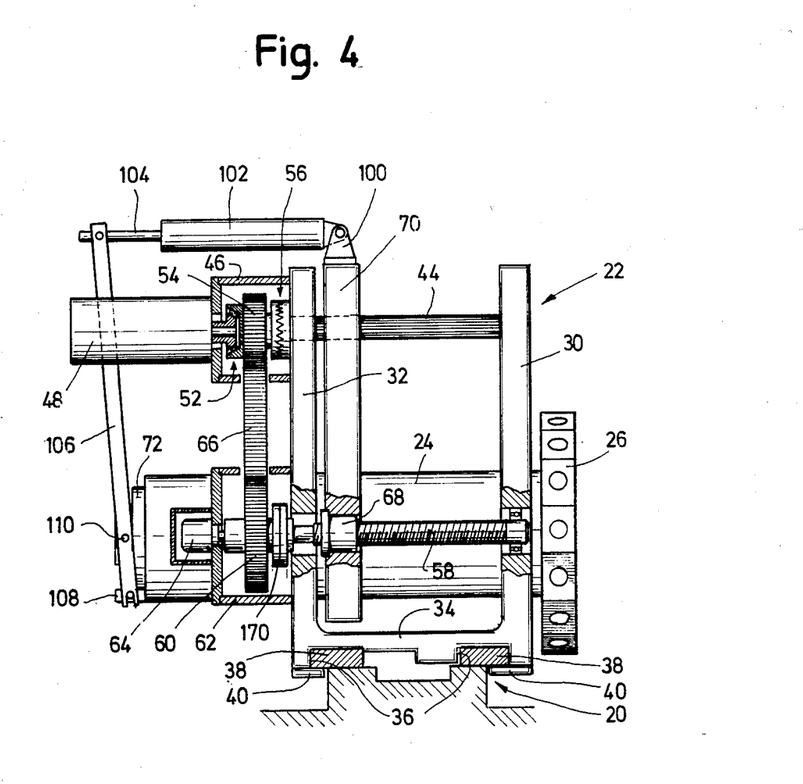
FIG. 4 is a side view of the turret and its slides, viewed in the direction of the arrow A in FIG. 3.
Figure 5:
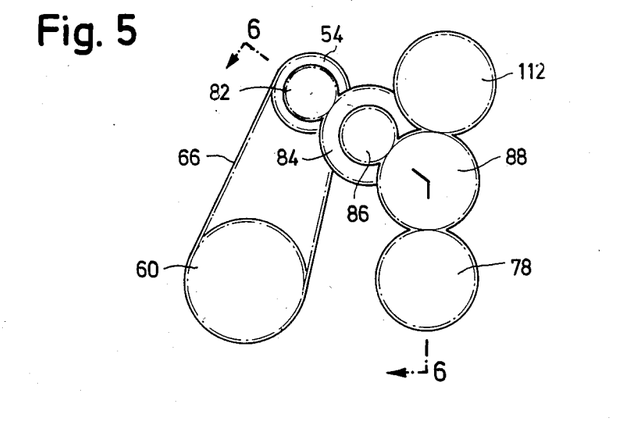
FIG. 5 is a schematic representation of the turret indexing gear.

As is apparent from FIG. 4, the lower slide 22, viewed in the direction of the working spindle 14, is of approximate U-shaped configuration, with two vertical cheeks 30 and 32 joined together by a horizontal base 34. On the underside of the base are two guide grooves 36 by means of which it is guided along two guide rails 38 of the guide 20. To prevent a lifting off of the lower slide 22 from the guide 20, holding down members 40 gripping the guide rails 38 at the bottom are attached to the lower slide 22.

An indexing drive shaft 44 is mounted, in the form of a multiple splined shaft, for rotatable motion and axial immobility, in the cheeks 30, 32 of the lower slide 22. At the rear side of the cheek 32 there is mounted, via a housing cap 46, an electric motor 48 whose drive shaft 50, coaxial to the indexing drive shaft 44, carries a toothed belt wheel 54 via an overload slipping clutch 52. The toothed belt wheel is connected to one half and the indexing drive shaft 44 to the other half of an electromagnetic drive coupling, in the form of a toothed coupling 56, in order that the drive connection between the toothed belt wheel 54 and the indexing drive shaft 44 may be interrupted.

As shown in FIG. 4, there is also mounted in the cheeks 30 and 32 of the lower slide 22, for rotatable motion and axial immobility, a ball roller spindle 58 having a further toothed belt wheel 60 secured to its rear end. A further housing cap 62 which is attached to the rear side of the cheek 32 and carries a resolver 64 driven by the ball roller spindle 58 serves as bearing for the ball roller spindle 58. A toothed belt 66 runs on toothed belt wheels 54 and 60 so that the electric motor 48 also drives the ball roller spindle 58 via the overload splipping clutch 52.

The nut 68 of the ball roller spindle 58 is attached to an indexing gear housing 70, which serves as feeding device for the upper turret slide 24 and is fixedly secured thereto. Accordingly, rotation of the ball roller spindle 58 causes displacement of the indexing gear housing 70 in the longitudinal direction of the ball roller spindle and thus displacement of the upper slide 24 in the direction of the axis 28.

Figure 6:
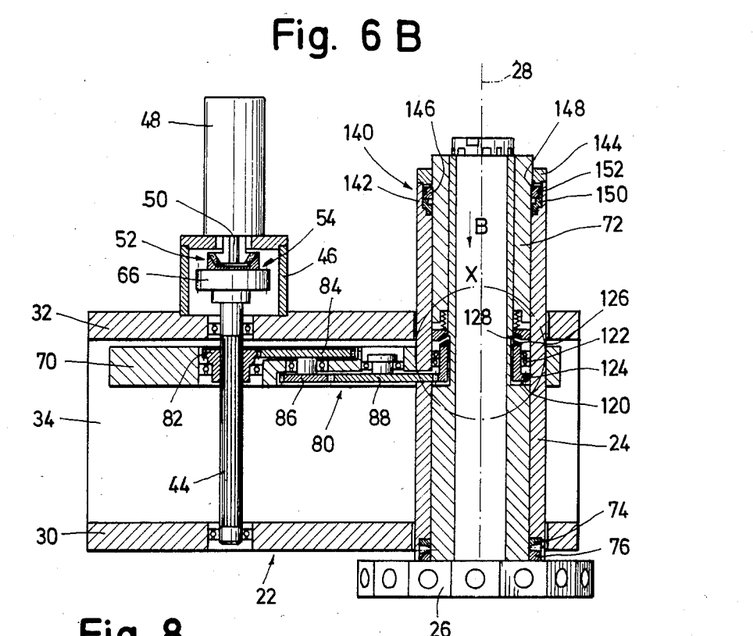
FIG. 6A is a section taken along line 6—6 in FIG. 5 through the first embodiment of the lathe illustrated in the preceding Figures.
FIG. 6B is a section corresponding to FIG. 6A taken through a second embodiment of the lathe.
Figure 6A:
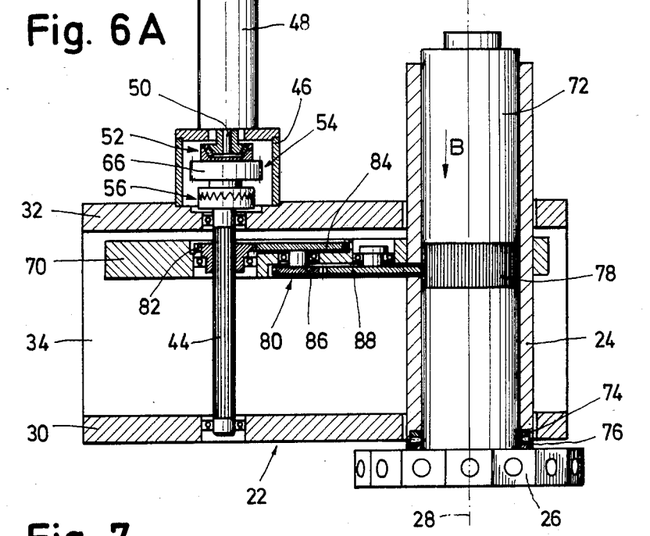
Figure 7:
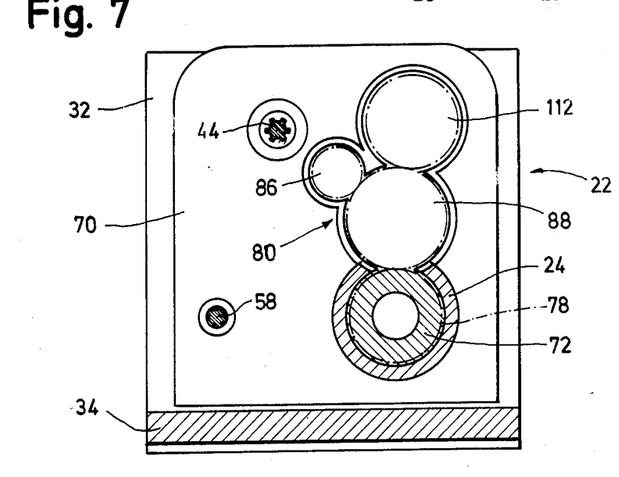
FIG. 7 is a section taken through line 7—7 in FIG. 3.

FIGS. 6A and 7 show that the upper turret slide 24, also called sleeve, is constituted by a hollow cylinder and is slidably guided in the cheeks 30 and 32 of the lower slide 22. It serves as bearing for a hollow turret shaft 72 at whose front end the turret 26 is secured. The turret shaft 72 which is mounted for rotation and longitudinal displacement in the upper slide 24 may be prevented from rotating, more particularly, by means of two annular gears 74 and 76, the first of which 74 is secured to the upper slide 24 and the second 76 to the turret 26 or the turret shaft 72, respectively. To release this rotation prevention, the turret shaft 72 is displaced in the direction of the arrow B (see FIG. 6A) relative to the upper slide 24, by means which shall be described hereinafter. To rotate or index the turret 26, the turret shaft 72 comprises in the center area of its circumference a toothing 78 which meshes with a turret indexing gear 80 arranged in the indexing gear housing 70. The turret indexing gear comprises a drive toothed wheel 82 displaceable on the indexing drive shaft 44, but connected thereto for rotation therewith, a first intermediate wheel 84 mounted for rotation in the gear housing 70 and meshing with the drive toothed wheel 82, a second intermediate wheel 86 connected to the first intermediate wheel, and an output toothed wheel 88 which is similarly mounted for rotation in the indexing gear housing 70 and meshes with the turret shaft toothing 78. The turret shaft toothing is of relatively long configuration in order to be able to displace the turret shaft 72 relative to the turret indexing gear 80 in the direction of the arrow B. Accordingly, rotation of the indexing drive shaft 44 causes rotation of the turret shaft 72, with the unit consisting of turret indexing gear 80, upper slide 24 and turret shaft 72 being displaceable relative to the lower slide 22 in the direction of the axis 28 without the drive connection between the indexing drive shaft 44 and the turret shaft 72 being thereby interrupted.

As is apparent from FIG. 4, there is mounted on the indexing gear housing 70 a bearing collar 100 having a double acting pneumatic cylinder 102 hinged thereto. Its piston rod 104 actuates a lever 106, which is articulated thereto and to a bearing collar 108 secured to the upper turret slide 24 and which abuts a shoulder of the turret shaft 72 via a hinge pin 110. Accordingly, actuation of the pneumatic cylinder 102 effects displacement of the turret shaft 72 in the direction of the arrow B (see FIG. 6A) in order to separate the annular gears 74, 76 from one another, and the return stroke of the pneumatic cylinder serves to prevent the turret shaft from unintentional rotation again.

The output toothed wheel 88 of the turret indexing gear 80 meshes not only permanently with the turret shaft toothing 78, but also with a drive toothed wheel 112 of a stepping signal device 114 in the form of a cycle switch which is secured to the cheek 32 of the lower slide 22 and upon rotation of the turret 26 generates for each of the possible positions of the turret a signal which is so coded that the turret positions are identifiable. Since such cycle switches are known, a more detailed description of the stepping signal device 114 is unnecessary. It should, however, be noted that the number of teeth on the drive toothed wheel 112 corresponds to that on the turret shaft toothing 78 so that one rotation of the stepping signal device 114 corresponds to one rotation of the turret 26.

As previously mentioned, the indexing and positioning of the turret 26 is, however, controlled via the path measuring system associated with the lower turret slide 22, i.e., in the embodiment shown, via the resolver 64, while the stepping signal device 114 only serves to report back the set position of the tool turret 26.

The embodiment shown in FIGS. 6B and 8 to 10 differs from the first embodiment in two respects: Instead of the drive coupling 56, in the form of a toothed coupling, arranged between the drive motor 48 and the indexing drive shaft 44, there is provided a friction coupling which is integrated in the upper turret slide 24 like the means for separating the annular gears 74 and 76, which simultaneously serve to actuate the aforementioned friction coupling. Accordingly, in FIGS. 6B and 8 to 10, the same reference numerals as in FIGS. 1 to 7 were used for all other parts, and only those features by which the second embodiment differs from the first shall be described hereinafter.

Figure 8:
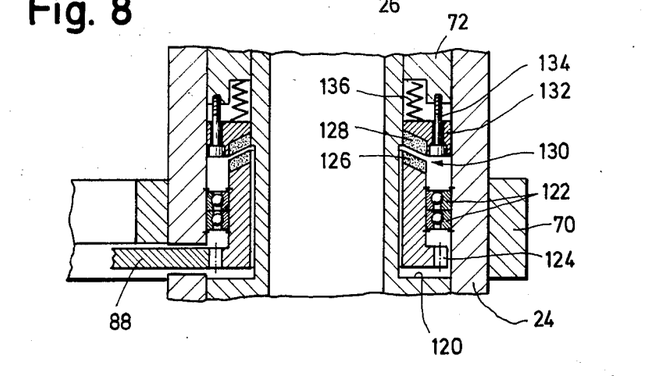
FIG. 8 shows the section marked "X" in FIG. 6B on an enlarged scale.

The turret shaft 72 comprises a circumferential groove 120 accommodating a toothed wheel hub 124 held by means of ball bearings 122 for rotatable motion and axial immobility at the upper turret slide 24. The toothed wheel hub meshes with the output toothed wheel 88 of the turret indexing gear 80 and carries a friction lining 126 which together with a second friction lining 128 forms a friction coupling 130. A ring 132 carrying the friction lining 128 is nonrotatably mounted at the turret shaft 72 by means of threaded guide bolts 134 screwed into the turret shaft, but is displaceable in the axial direction and is subject to the influence of prestress springs 136 supported on the turret shaft 72 which are already prestressed when the friction coupling 130 is disengaged and the ring 132 rests against the heads of the threaded guide bolts 134, as is shown in FIG. 8. Accordingly, in this preferred embodiment, no regard need be paid to separation of a toothed coupling, as is the case with the drive coupling 56 of the first embodiment. Furthermore, the drive coupling in the form of the friction coupling 130 is accommodated by the upper turret slide 24.

This also applies to a double acting hydraulic cylinder 140, whose actual cylinder 142 is constituted by the upper slide 24 closed by a cylinder cover 144 and which comprises a piston 146 which is held at the turret shaft 72 between a shoulder 148 of the turret shaft 72 and a retaining ring 150 attached thereto for rotatable motion relative to the turret shaft, but immobility in the axial direction. In this way, the seal 152 arranged in the piston 146 is not stressed in the circumferential direction when the turret shaft 72 is rotated in the upper turret slide 24, but only in the axial direction when the turret shaft 72 is displaced in the upper turret slide 24. The two cylinder areas of the hydraulic cylinder 140 which are located in front of and behind the piston 146 are apparent from FIG. 6B, while the hydraulic bores and hydraulic lines leading to these cylinder areas have been omitted for reasons of simplicity.

If the cylinder area located above the piston 146 in FIG. 6B is now supplied with pressure oil, the turret shaft 72 is displaced downwardly in the direction of the arrow B, with the two friction linings 128 and 126 first being made to abut before removal of the annular gear 76 from the annular gear 74 to ensure that the tool turret 26 is prevented from undesired rotation before the locking mechanism formed by the two annular gears 74 and 76 is released. When the turret shaft 72 is pushed further forward in the direction of the arrow B, the annular gear 76 is then raised out of the annular gear 74, and the pressing force between the friction linings 126 and 128 increased to such an extent that the turning and braking moments required to accelerate and brake the tool turret 26 can be reliably transmitted when the electric motor 48 is switched on for further indexing of the turret 26 via the turret indexing gear 80. To release the friction coupling 130 and pull the annular gear 76 into the annular gear 74 again, the cylinder area located underneath the piston 146 in FIG. 6B is supplied with pressure oil. In the preferred embodiment shown in FIGS. 6B and 8, the path of the turret shaft 72 required to raise the annular gear 76 out of the annular gear 74 is approximately ten times the size of the path required to make the friction linings 126 and 128 abut one another; in this way, the friction coupling 130 is already closed for enough, right at the beginnng of the displacement of the turret shaft 72, for the tool turret 26 to be prevented from unintentional rotation. Also, in this way, the friction coupling 130 and the upper turret slide 24 (sleeve) are protected against shock-like stressing during engagement of the friction coupling 130.

Figure 9:
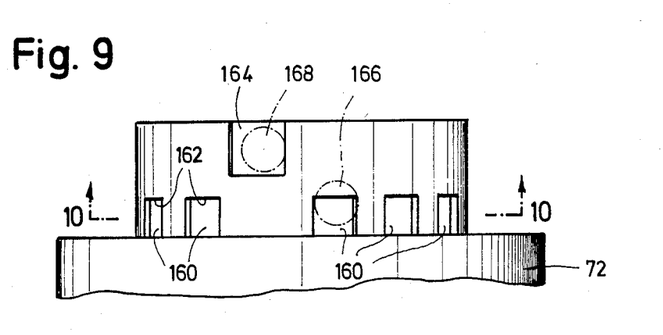
FIG. 9 shows the rear end of the turret shaft in the embodiment shown in FIG. 6B on an enlarged scale.
Figure 10:
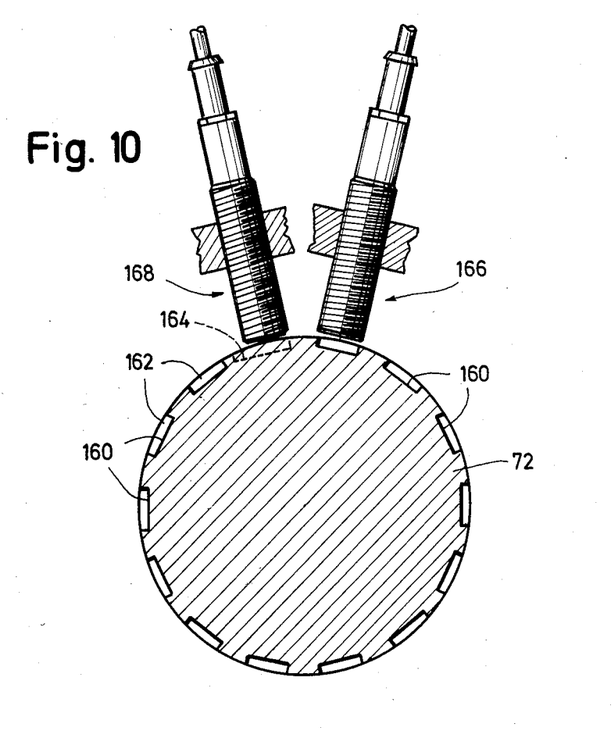
FIG. 10 is a section taken along line 10—10 with the scanners associated with the turret shaft.

As is apparent from FIGS. 6B and 9 and 10, in this preferred embodiment, the turret shaft 72 carries at its rear end a first track of angle of rotation markings 160 in the form of groove-like recesses each deliminted in the axial direction by one edge 162, which edges, as will be explained hereinafter, constitute axial position markings in order to be able to distinguish the forwardly pushed position of the turret shaft 72, in which the friction coupling 130 is engaged and the annular gears 74, 76 are released from one another, from the position shown in FIGS. 6B and 8. The turret shaft 72 is furthermore provided with a second track comprised of one single angle of rotation marking, which again is also in the form of a groove-like recess. Associated with the first track formed by angle of rotation markings 160 is a first scanner 166 and associated with the second track formed by the angle of rotation marking 164 is a second scanner 168, which scanners are held by means not shown by the upper turret slide 24 in their positions shown in FIGS. 9 and 10 and stationary relative to the upper turret slide 24. The total number and arrangement of the angle of rotation markings 160 and 164 corresponds to the number and position of the possible indexing positions of the tool turret 26, with the angle of rotation marking 164 designating a zero position of the turret 26 via the second scanner 168, while the angle of rotation markings 160 and the first scanner 166 indicate the reaching of the other indexing positions of the tool turret. The scanner 166 also scans the edges 162 of the angle of rotation markings 160, thereby ascertaining whether the turret shaft 72 and thus the turret 26 are in their state locked by the annular gears 74, 76, or in the forwardly pushed state in which the annular gears are separated from one another and the friction coupling 130 is engaged. The scanners 166 and 168 are known switches which operate in a non-contacting manner, e.g., inductive proximity switches. In order to also be able to ascertain whether the friction coupling 130 is engaged and the annular gears 74 and 76 are separated from one another, when the turret 26 is in the zero position, there could be added to the first track formed by the angle of rotation markings 160, a further angle of rotation marking 160 with an edge 162 which according to FIG. 9 would then lie underneath the angle of rotation marking 164. Another possibility consists in scanning the rear, i.e., in FIG. 9 upper edge of the turret shaft 72 with the scanner 168.

To prevent displacement of the turret slide when the turret is rotated, a further actuatable coupling may, within the scope of the invention, be provided between the slide drive and the gear member driving the turret slide, i.e., the ball roller spindle 58 in the embodiment shown; such an electromagnetic coupling 170 is indicated in FIG. 4. The embodiment shown has the advantage that the resolver 64 can still be used to monitor rotation of the turret.

Hereinabove only embodiments in which the turret indexing axis extends parallel to the guiding direction of the turret slide have been described. This, however, is not a precondition for realization of the invention; the turret indexing axis may, for example, extend obliquely to the guiding direction of the turret slide, and a bevel gearing may be mounted between the shaft carrying the tool turret and the remaining turret indexing drive.

What is claimed is:

1. An NC turret lathe comprising a frame; a spindle rotatably mounted on said frame; means on said spindle for holding a workpiece; a slide slidably guided on said frame along a path of movement; a tool turret mounted on said slide for rotation about an indexing axis; drive means operatively connected to said slide; control means constantly coupled with said drive means for monitoring said drive means; first connecting means constantly interconnecting said drive means and said slide whereby said drive means moves said slide along said path of movement; second connecting means interconnecting said drive means and said turret whereby said turret is rotated about said indexing axis by said drive means; said second connecting means including a drive coupling movable between engaged and disengaged positions whereby said drive means is operatively connected to rotate said turret only when said drive coupling is in its engaged position; said drive means remaining in operative connection with said first connecting means and slide regardless of the position of said drive coupling.

2. The lathe of claim 1 in which said second connecting means comprises an indexing drive shaft driveable by said drive means arranged parallel to the movement path of the turret slide; the second connecting means also having a gear member mounted on said shaft in permanent drive connection therewith and being displaceable along the length thereof; said gear member being connected to the turret slide and movable therewith.

3. The lathe of claim 2 in which the drive coupling is provided between the indexing drive shaft and the drive means.

4. The lathe of claim 1 or 2, in which the indexing drive shaft is a splined shaft and the gear member is a toothed wheel gear which is displaceable on the splined shaft.

5. The lathe of claim 2, in which a housing houses the gear of said second connecting means and the first connecting means comprises a ball roller spindle which extends parallel to the movement path of the turret slide; said first connecting means including a nut which is connected to said housing; said turret slide being connected to the housing for movement therewith.

6. The lathe of claims 1, 2, or 3, in which the drive coupling comprises a friction coupling.

7. The lathe of claims 1, 2, or 3, wherein the turret is secured against rotation relative to said turret slide via a releasable locking device, and a common actuating means for actuating both the drive coupling and the locking device.

8. The lathe of claim 7 in combination with means which coordinate the engagement of the drive coupling with the release of the locking device whereby the latter is not released until the drive coupling is in the operable position.

* * * * *